United States Patent
Kodama et al.

(10) Patent No.: US 6,922,621 B2
(45) Date of Patent: Jul. 26, 2005

(54) VEHICLE STEERING CONTROL SYSTEM

(75) Inventors: Kazumasa Kodama, Toyota (JP); Junji Kawamuro, Susono (JP); Takahiro Kojo, Susono (JP); Masatoshi Nakatsu, Susono (JP); Masahiro Miyata, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 187 days.

(21) Appl. No.: 10/626,626

(22) Filed: Jul. 25, 2003

(65) Prior Publication Data

US 2005/0023072 A1 Feb. 3, 2005

(30) Foreign Application Priority Data

Jul. 26, 2002 (JP) ........................................ 2002-217814

(51) Int. Cl.[7] .................................................. B62D 5/04
(52) U.S. Cl. .......................... 701/41; 701/43; 180/443; 180/446
(58) Field of Search ...................... 701/41–43; 180/421, 180/422, 443, 445, 446

(56) References Cited

U.S. PATENT DOCUMENTS 6,705,424 B2 * 3/2004 Ogawa et al. .............. 180/446
6,843,344 B2 * 1/2005 Kodama et al. ............. 180/446
2002/0024336 A1   2/2002 Desbiolles et al.
2004/0200661 A1 * 10/2004 Sugitani et al. ............. 180/402
2005/0016791 A1 *  1/2005 Fukushima et al. ......... 180/446

FOREIGN PATENT DOCUMENTS

JP          11-334604       12/1999
JP          11-334628       12/1999

OTHER PUBLICATIONS

Patent Abstract of Japan, JP 11–334628, Dec. 7, 1999.

* cited by examiner

*Primary Examiner*—Gary Chin
(74) *Attorney, Agent, or Firm*—Oblon, Spivak, McClelland, Maier & Neustadt, P.C.

(57) ABSTRACT

A drive controlling unit includes a final angle position memorizing device for memorizing a final angle position at a time of termination of the vehicle driving operation, an input complete data memorizing device capable of switching the memory content between a first memory condition and a second memory condition. The first memory condition indicates completeness of writing of the final angle position in the final angle position memorizing device. The second memory condition indicates failure in writing the final angle position therein. The input complete data memorizing device is capable of maintaining the memory content even when the vehicle is stationary.

14 Claims, 9 Drawing Sheets

| 130 | | | | | |
|---|---|---|---|---|---|
| Vehicle Speed (V) | $V_1$ | $V_2$ | $V_3$ | .......... | $V_n$ |
| Steering Angle Exchanging Ratio ($\alpha$) | $\alpha_1$ | $\alpha_2$ | $\alpha_3$ | .......... | $\alpha_n$ |

$\alpha = \theta/\varphi$    $\varphi$: Angular position of handle shaft
$\theta$: Angular position of steering shaft

FIG. 5

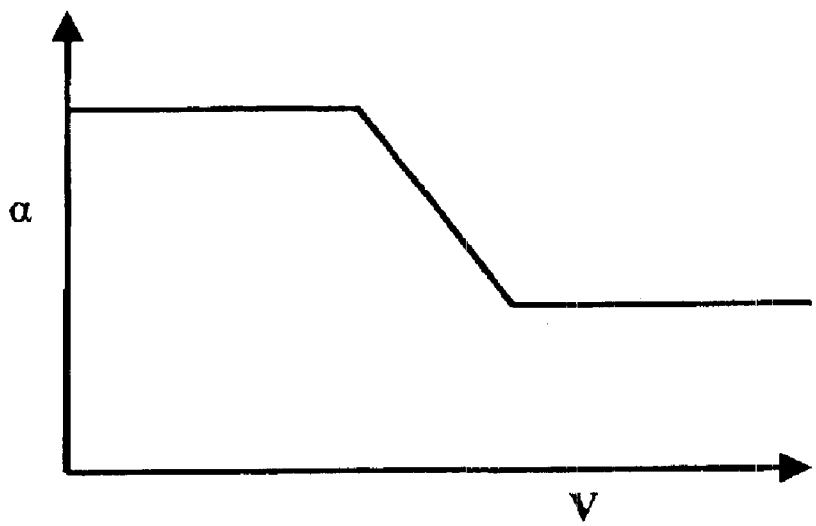

FIG. 6

| 131 | | | | | | |
|---|---|---|---|---|---|---|
| $\Delta\theta$ \ $V_s$ | $V_{s1}$ | $V_{s2}$ | $V_{s3}$ | $V_{s4}$ | .......... | $V_{sn}$ |
| $\Delta\theta_1$ | $\eta_{11}$ | $\eta_{12}$ | $\eta_{13}$ | $\eta_{14}$ | .......... | $H_{1n}$ |
| $\Delta\theta_2$ | $\eta_{21}$ | $\eta_{22}$ | $\eta_{23}$ | $\eta_{24}$ | .......... | $H_{2n}$ |
| $\Delta\theta_3$ | $\eta_{31}$ | $\eta_{32}$ | $\eta_{33}$ | $\eta_{34}$ | .......... | $H_{3n}$ |
| $\Delta\theta_4$ | $\eta_{41}$ | $\eta_{42}$ | $\eta_{43}$ | $\eta_{44}$ | .......... | $H_{4n}$ |
| .... | .... | .... | .... | .... | .......... | .... |
| $\Delta\theta_m$ | $\eta_{m1}$ | $\eta_{m2}$ | $\eta_{m3}$ | $\eta_{m4}$ | .......... | $\eta_{mn}$ |

$\eta$: Duty Ratio        $\theta'$: Target angular position of steering shaft
$\Delta\theta = \theta' - \theta$        $\theta$: Present angular position of steering shaft

FIG. 7

VEHICLE STEERING CONTROL SYSTEM

CROSS REFERENCE TO RELATED APPLICATIONS

This application is based on and claims priority under 35 U.S.C. §119 with respect to a Japanese Patent Application 2002-217814, filed on Jul. 26, 2002, the entire content of which is incorporated herein by reference.

FIELD OF THE INVENTION

This invention generally relates to a steering control system for a vehicle such as an automobile.

BACKGROUND OF THE INVENTION

In a conventional steering control system for a vehicle especially for an automobile, an operation angle of a steering wheel (i.e. a steering wheel operation angle) has been publicly known to be transmitted to a vehicle wheel to be steered without being varied. That is, the steering wheel operation angle is always transferred at one for one rate (1:1) for a vehicle wheel steering angle. However, recent developments have lead to the vehicle steering control system mounting a variable steering angle conversion ratio mechanism by which a conversion ratio for converting the steering wheel operation angle to the vehicle wheel steering angle (hereinafter, referred to as a steering angle conversion ratio) is varied in accordance with vehicle driving conditions such as a vehicle speed. At a time of vehicle high-speed travel, it is preferable to set the steering angle conversion ratio at a relatively small ratio. In this case, the steering of vehicle wheel angle can be prevented from being rapidly increased in response to increase of the steering wheel operation angle, thereby enabling to stabilize the vehicle high-speed travel. On the other hand, at a time of vehicle low-speed travel, it is preferable to set the steering angle conversion ratio at a relatively large ratio. In this case, the vehicle wheel can be steered to the maximum steering extent possible with the small steering wheel operation angle. That is, the driver does not have to operate the steering wheel many times so as to steer the vehicle wheel to the maximum steering extent possible. Therefore, it makes easier to perform driving performance, which requires the vehicle wheel to be steered at a relatively large steering angle, such as parking to a garage, parallel parking, and pulling over to the kerb.

One type of variable steering angle conversion ratio mechanism has been disclosed in a Japanese Patent Laid-Open Publication published as No. 1999-334604. Disclosed above has a geared transmitting unit which directly connects a shaft connected to the steering wheel (i.e. a steering wheel shaft) and a vehicle wheel steering shaft with a variable gear ratio. However, the construction of the geared transmitting unit may become complicated.

In another Japanese Patent Laid-Open Publication published as No. 1999-334628, disclosed is a vehicle steering control system with a variable steering angle conversion ratio mechanism in which the vehicle wheel steering shaft is driven for its rotation by an actuator such as a motor. More particularly, a target vehicle wheel steering angle is computed based upon the steering wheel operation angle detected by an angle detecting unit and the steering angle conversion ratio determined in accordance with the vehicle driving conditions. The actuator such as the motor rotates the vehicle wheel steering shaft, which is mechanically disconnected from the steering wheel shaft, so as to steer the vehicle wheel at the target vehicle wheel steering angle.

However, when the steering wheel shaft and the vehicle wheel steering shaft are mechanically disconnected as described above, following problem may arise.

Namely, when the vehicle driving operation is terminated leaving the steering wheel steered at a certain steering angle, the actuator also terminates the rotation of the vehicle wheel steering shaft at that time. At this point, the vehicle wheel steering shaft remains at an angle position at the time of the termination of the vehicle driving operation (i.e. a final angle position). The final angle position is stored in a control unit of the actuator. When the vehicle secondly starts, the vehicle wheel steering shaft is driven again for its rotation by the actuator from the stored final angle position which has been assumed as an initial angle position for this second vehicle operation. However, there may be a case as one of likely problems, that the final angle position can not be stored in the control unit of the actuator for some reasons. In this case, the vehicle wheel steering shaft is disabled to be normally driven for its second rotation by the actuator.

A need thus exists for providing an improved vehicle steering control system capable of accurately identifying whether or not the final angle position at the time of the termination of the vehicle driving operation was successfully written in the control unit.

SUMMARY OF THE INVENTION

In light of the foregoing, according to an aspect of the present invention, a steering control system for a vehicle includes a steering wheel shaft transmitted with an operation angle of a steering wheel, a vehicle wheel steering shaft mechanically disconnected from the steering wheel shaft, and an actuator for rotating the vehicle wheel steering shaft at a vehicle wheel steering angle depending on the operation angle of the steering wheel and a vehicle driving condition. The steering control system further includes a steering wheel shaft angle detecting means for detecting a steering wheel shaft angle position, a vehicle wheel steering shaft angle detecting means for detecting a vehicle wheel steering shaft angle position, a vehicle condition detecting means for detecting the vehicle driving condition, and a drive controlling means for determining a target angle position of the vehicle wheel steering shaft based upon the steering wheel shaft angle position and the vehicle driving condition and for controlling the operation of the actuator so as to approximate the vehicle wheel steering shaft angle position to the target angle position.

The drive controlling means includes a final angle position memorizing means for memorizing a final angle position representing the vehicle wheel steering shaft angle position at a time of termination of the vehicle driving operation. The final angle position memorizing means is capable of maintaining the memory content even when the vehicle is stationary. The drive controlling means further includes an input complete data memorizing means capable of switching the memory content between a first memory condition and a second memory condition. The first memory condition indicates completeness of writing of the final angle position in the final angle position memorizing means. The second memory condition indicates failure in writing the final angle position therein. The input complete data memorizing means is capable of maintaining the memory content even when the vehicle is stationary. The drive controlling means still further includes an input complete data memory controlling means for setting the memory content memorized in the input complete data memorizing means at the first memory condition in response to the completeness of writing of the final angle position in the final angle position memorizing means, and an initial angle position set controlling means for allowing to employ the final angle position memorized in the final angle position memorizing means as an initial angle position of the vehicle wheel steering shaft when the memory content in the input complete data memorizing means is at the first memory condition at a time of restart of the vehicle driving operation after temporal termination of the vehicle driving operation, and for prohibiting to employ the final angle position as the initial angle position when the memory content in the input complete data memorizing means is at the second memory condition at the time of restart of the vehicle driving operation after the temporal termination of the vehicle driving operation.

It is preferable that the input complete data memory controlling means sets the input complete data memorizing means at the second memory condition at a time of commencement of the vehicle driving operation and updates the memory content in the input complete data memorizing means so as to set the input complete data memorizing means at the first memory condition when the final angle position is written into the final angle position memorizing means at the time of the termination of the vehicle driving operation. The input complete data memory controlling means does not update the memory content in the input complete data memorizing means when the final angle position fails to be written in the final angle position memorizing means.

It is further preferable that the steering control system for a vehicle further includes a CPU and a RAM as a work area of the CPU included in the drive controlling means, and a vehicle wheel steering shaft angle position memorizing means for memorizing a detected value of the vehicle wheel steering shaft angle position during the vehicle driving operation as needed. The vehicle wheel steering shaft angle position memorizing means is included in the RAM. The CPU and the RAM are designed such that supply of electric power from a vehicle battery to the CPU and the RAM is interrupted in response to the termination of the vehicle driving operation. In addition, steering control system for vehicle still further includes backup power source for extending a time span for supplying electric current to the CPU and RAM for a predetermined time span.

BRIEF DESCRIPTION OF THE DRAWING FIGURES

The foregoing and additional features and characteristics of the present invention will become more apparent from the following detailed description considered with reference to the accompanying drawing figures wherein:

FIG. 5 is a table for explaining a relationship between a steering angle conversion ratio and a vehicle speed;

FIG. 6 is a graph illustrating an example of a pattern for varying a steering angle conversion ratio in response to the vehicle speed;

FIG. 7 is a two-dimensional table for determining a duty ratio based upon a motor power supply voltage and an angle deviation $\Delta\theta$;

DETAILED DESCRIPTION OF THE INVENTION

An embodiment of the present invention will be described hereinbelow in detail with reference to the accompanying drawings.

Figure 1:
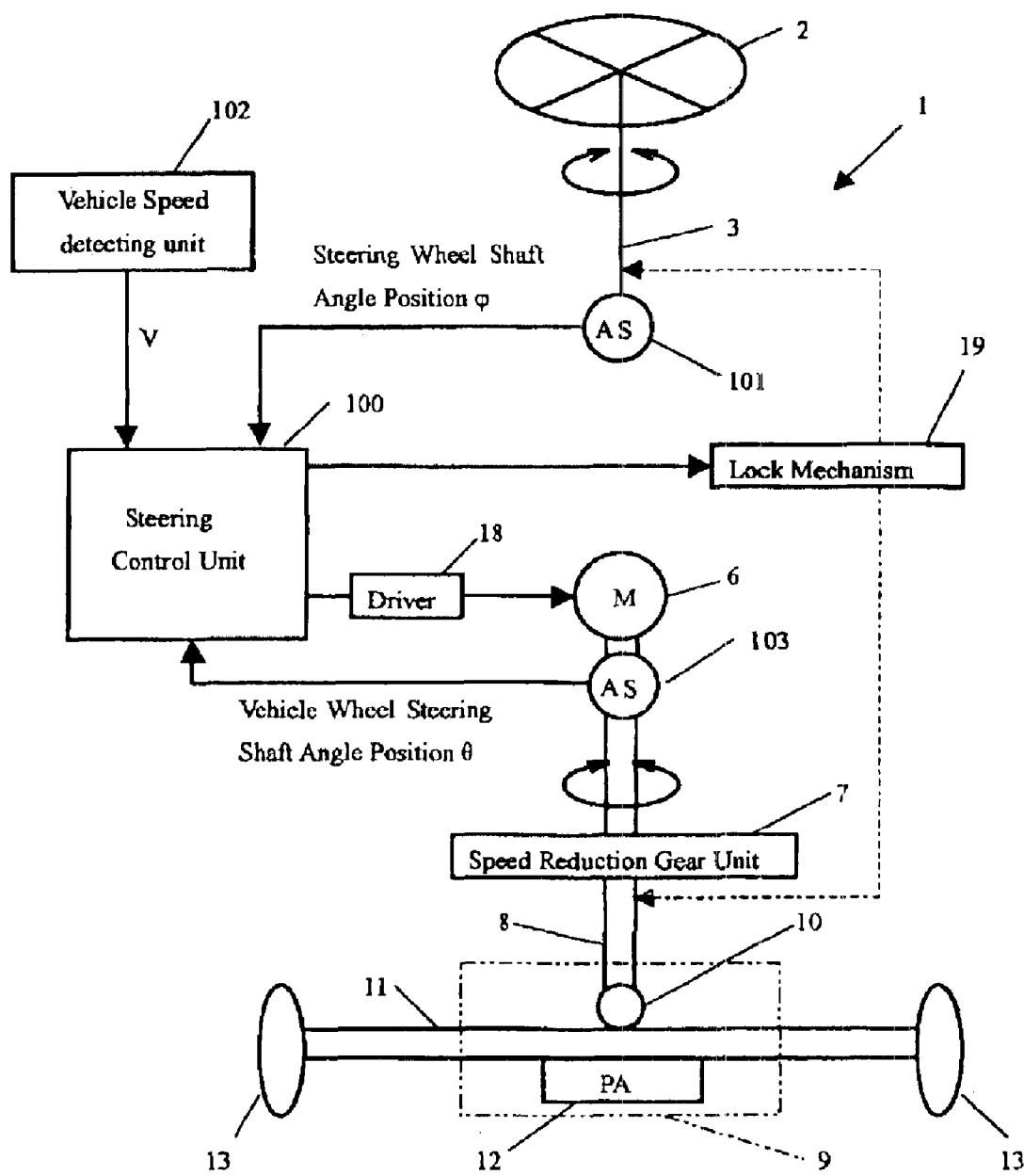
FIG. 1 is a diagram schematically illustrating an entire structure of a vehicle steering control system according to an embodiment of the present invention.

As illustrated in FIG. 1, a vehicle steering control system 1 according to the embodiment of the present invention includes a shaft 3 connected directly to a steering wheel 2 (hereinafter, referred to as a steering wheel shaft 3), and a shaft 8 for a vehicle wheel to be steered (hereinafter, referred to as a vehicle wheel steering shaft 8) which is mechanically disconnected from the steering wheel shaft 3. The vehicle wheel steering shaft 8 is rotatably driven by a motor 6 as an actuator. A one end of the vehicle wheel steering shaft 8 extends into a steering gear unit 9 in which a pinion gear 10 rotatable with the vehicle wheel steering shaft 8 reciprocates a rack bar 11 in an axial direction thereof. Therefore, a steering angle of each front-left vehicle wheel (or rear-left vehicle wheel) and front-right vehicle wheel (or rear-right vehicle wheel) can be changed. The vehicle steering control system 1 according to the embodiment of the present invention is provided with a known power steering apparatus in which driving torque for reciprocating the rack bar 11 can be reinforced by a known power assisting mechanism 12. The power assisting mechanism 12 can operate in a hydraulic manner, an electrically driven manner, or an electrically driven and hydraulic manner.

The vehicle steering control system 1 further includes a steering control unit 100 (i.e. a drive controlling means), a steering wheel shaft angle detecting unit 101 (i.e. a steering wheel shaft angle detecting means), a vehicle wheel steering shaft angle detecting unit 103 (i.e. a vehicle wheel steering shaft angle detecting means), and a vehicle speed detecting unit (e.g. a vehicle speed sensor) 102 (i.e. a vehicle condition detecting means) for detecting a vehicle speed V as a vehicle condition detecting unit. The steering wheel shaft angle detecting unit 101 is configured with a known angle detecting unit such as a rotary encoder and detects an angle position of the steering wheel shaft 3 (hereinafter, referred to as a steering wheel shaft angle position $\phi$). The vehicle wheel steering shaft angle detecting unit 103 is configured with a known angle detecting unit such as a rotary encoder and detects an angle position $\theta$ of the vehicle wheel steering shaft 8 (hereinafter, referred to as a vehicle wheel steering shaft angle position θ). The vehicle speed detecting unit 102 is configured with a rotation detecting unit such as a rotary encoder and a taco generator and detects a rotation of a vehicle wheel 13. The steering control unit 100 then computes a target angle position θ' of the vehicle wheel steering shaft 8 based upon the steering wheel shaft angle position (and the vehicle speed V. Driving the motor 6 is controlled by a motor driver 18 so as to approximate or match the vehicle wheel steering shaft angle position θ to the target angle position θ'.

Disposed is a lock mechanism 19 between the steering wheel shaft 3 and the vehicle wheel steering shaft 8. The lock mechanism 19 establishes a locked condition, in which the steering wheel shaft 3 and the vehicle wheel steering shaft 8 are connected to each other for their integral rotation, and an unlocked condition, in which the shafts 3 and 8 are released from the connected condition. In the locked condition thereof, the operation angle of the steering wheel shaft 3 can be transferred to the vehicle wheel steering shaft 8 at one for one ratio of a steering angle conversion ratio, wherein a manual steering operation can be performed. The lock mechanism 19 is switched to the locked condition in response to a command signal from the steering control unit 100 at a time of malfunction of the motor 6 or the like.

Figure 2:
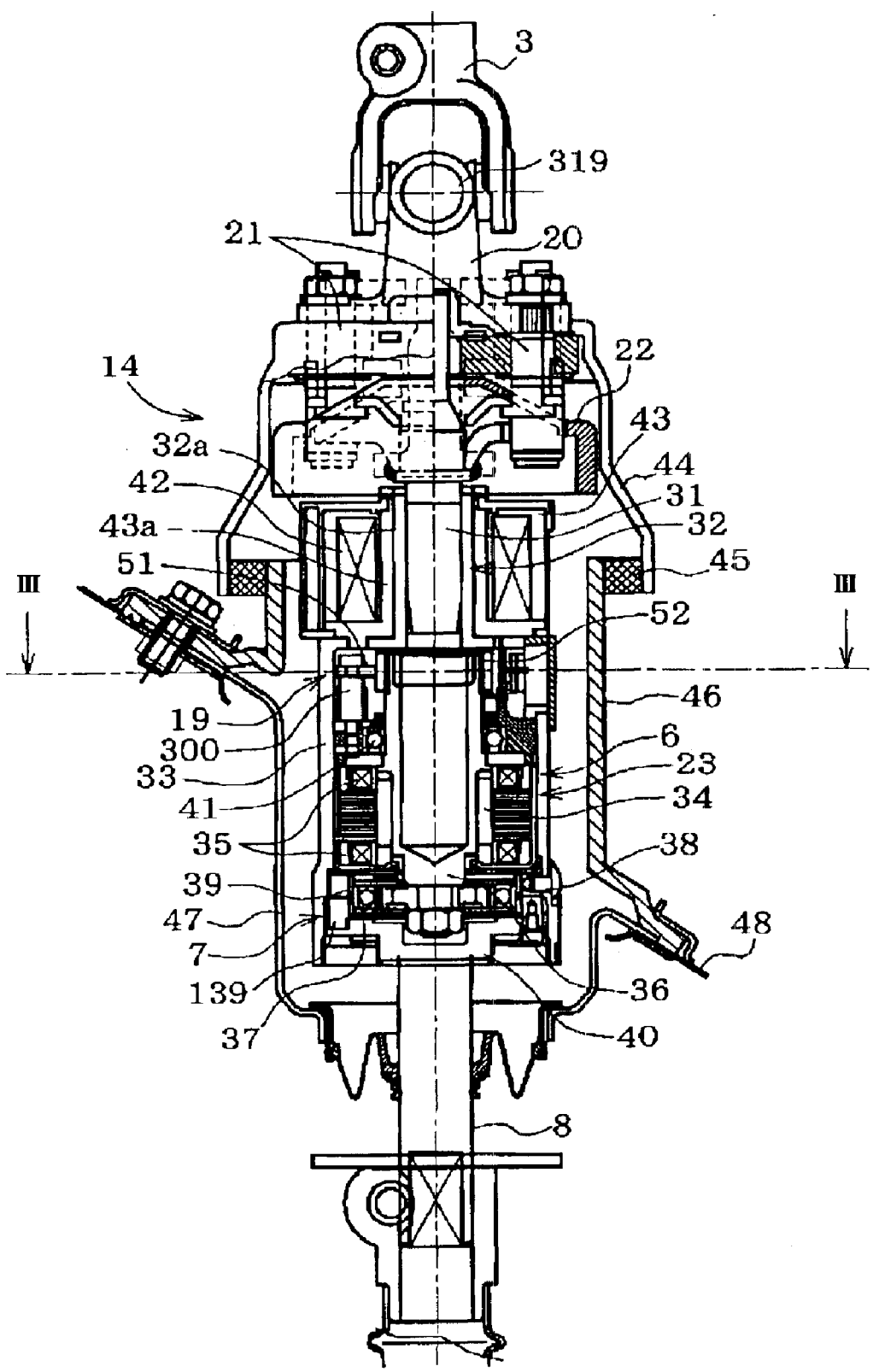
FIG. 2 is a longitudinal sectional view illustrating a driving unit according to the embodiment of the present invention.

As seen in FIG. 2, in a driving unit 14 having the motor 6, an approximately cylindrically shaped motor case 33 is integrally rotated with the motor 6 assembled inside thereof when the steering wheel shaft 3 rotates in response to the operation of the steering wheel 2. The steering wheel 3 is jointed with an input shaft 20 via a universal joint 319. The input shaft 20 is coupled to a first coupling member 22 via bolts 21. A pin 31 is integrally provided in the first coupling member 22. The pin 31 is received in a sleeve 32*a* in a messed manner therewith. The sleeve 32*a* rearwardly extends from a central portion of a plate surface at one end of a second coupling member 32. The motor case 33 is integrated with a plate surface at the other end of the second coupling member 32. A cover case 44, which is made of resin or rubber, is integrally rotated with the steering wheel shaft 3. The driving unit 14 is integrally provided with a cockpit panel 48 and is housed in a case 46. A clearance between the cover case 44 and the case 46 is sealed by a sealing ring 45.

Assembled integrally inside the motor case 33 is a stator portion 23 including stator coils 35 (for example, three-phase, stator coils U, V, W). A motor output shaft 36 is disposed inside the stator portion 23 via a bearing 41 so as to be rotated. An armature 34 made of a permanent magnet is integrally disposed at an outer peripheral surface of the motor output shaft 36. The stator coils 35 are disposed so as to surround the armature. Power supply terminals 50 extend from the stator coils 35 (U, V, W) in a direction of a rear end surface of the motor case 33. The stator coils 35 are supplied with electric current by a power supply cable 42 of which one end is connected to each power supply terminal 50.

As described later, the motor 6 is a brushless motor according to the embodiment of the present invention. The power supply cable 42 is configured with a band of wire set gathering wires for supplying electric power to the stator coil 35 for each phase (U, V, W) of the brushless motor. The power supply cable 42 is housed in a cable case 43 as being wound around a hub 43*a* of the cable case 43. The cable case 43 is arranged adjacent to the rear end side of the motor case 33. The other end of the power supply cable 42 is fixed to the hub 43*a* of the cable case 43. When the steering wheel shaft 3 is rotated with the motor case 33 and the power supply terminal 50 in a forward or reverse direction, the power supply cable 42 is wound inwards around the hub 43*a* or fed outwards such that the rotation of the motor case 33 can be effectively absorbed.

The rotational speed of the motor output shaft 36 is decelerated by a speed reduction gear unit 7 and is transmitted to the vehicle wheel steering shaft 8 at a predetermined ratio, for example at 1 for 50 (1/50) ratio. According to the embodiment of the present invention, the reduction gear unit 7 is configured with a harmonic drive reduction unit. That is, an elliptical bearing 37 with an inner race is integrally provided on the motor output shaft 36. A deformable thin external gear 38 is disposed at an outer side of the bearing 37. A first internal gear 39 and a second internal gear 139 are coaxially arranged at the outer side of the external gear 38 so as to be meshed with the external gear 38. The second internal gear 139 is integrated with the vehicle wheel steering shaft 8 via coupling 40. The first internal gear 39 is fixed to the motor case 33 for its integral rotation therewith. The second internal gear 139 is not fixedly assembled to the motor case 33 such that the second internal gear 139 is rotatable relative to the motor case 33. The difference in the number of teeth of the first internal gear 39 and the engaging external gear 38 is zero, and thus, a relative rotation with respect to the external gear 38 is not caused (that is, it can also be said that the first internal gear 39 and thus the motor case 33 and the steering wheel shaft 3 are connected with the rotating motor output shaft 36 in a freely-rotatable manner) The number of teeth of the second internal gear 139 is greater than the one of the external gear 38, for example by two teeth. Assuming that the number of teeth of the second internal gear 139 "N", and the difference of the number of teeth between the external gear 38 and the second internal gear 139 is "n", the rotational speed of the motor output shaft 36 is decelerated at a rate of n for N (n/N) and is transmitted to the vehicle wheel steering shaft 8. According to the embodiment of the present invention, the first and second internal gears 39 and 139 are assembled to be coaxial with the input shaft 20 of the steering handle shaft 3, the motor output shaft 36, and the vehicle wheel steering shaft 8, thereby enabling to size-down the driving unit 14 including the motor 6.

Figure 3:
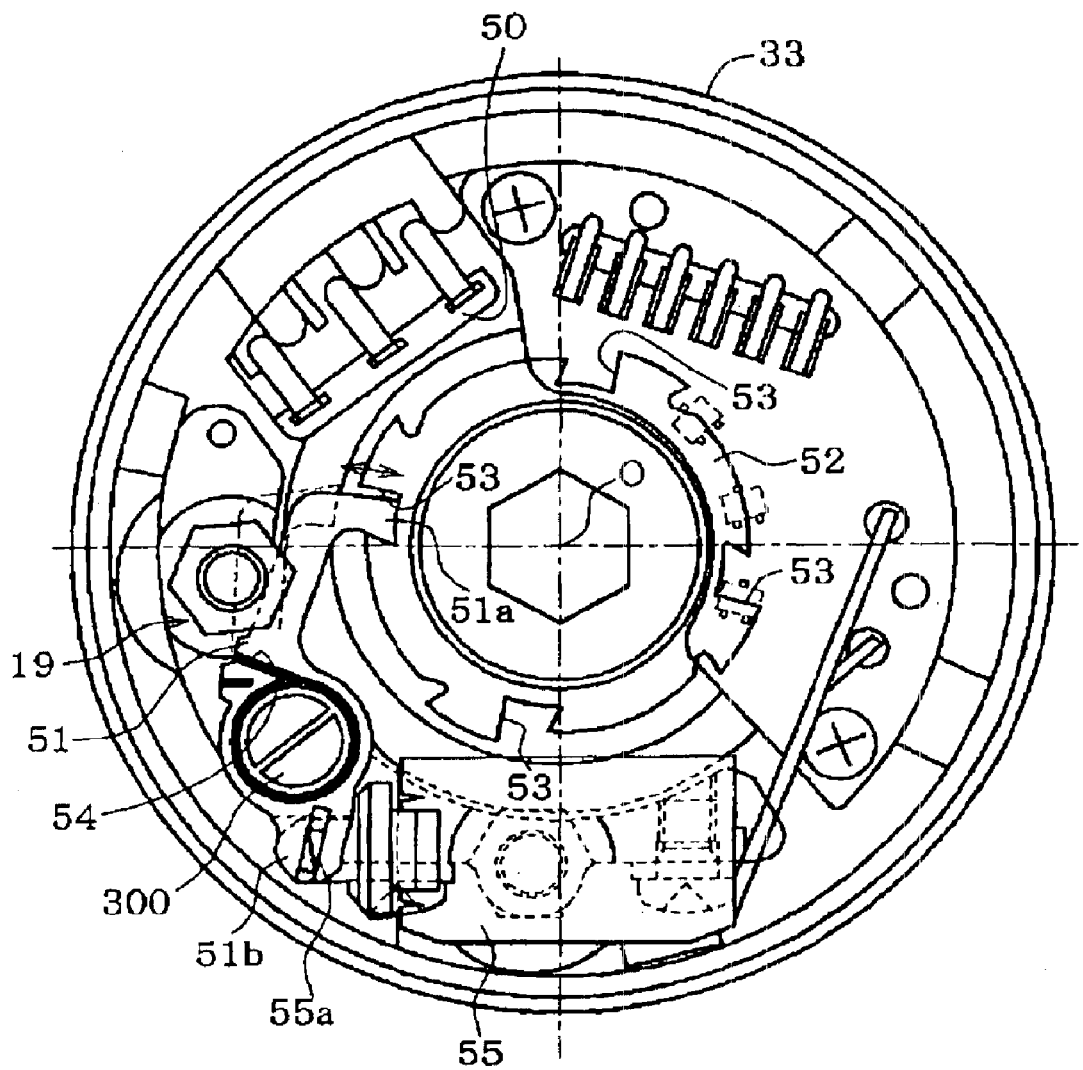
FIG. 3 is a cross sectional view of the driving unit taken along a line III—III in FIG. 2.

As seen in FIG. 3, the lock mechanism 19 includes a lock member 51 and a lock member receiving member 52. The lock member 51 is fixed to a lock base portion (i.e. the motor case 33) which is not rotatable relative to the steering wheel shaft 3. The lock member receiving member 52 is assembled at a lock member receiving base portion (i.e. at a side of the motor output shaft 36). As illustrated in FIG. 3, the lock member 51 is disposed so as to be movable to a locked position, at which the lock member 51 is engaged to a lock member receiving portion 53 defined at the lock member receiving member 52, and so as to be movable to an unlocked position, at which the lock member 51 is retracted and released from the engaged condition to the lock member receiving portion 53.

According to the embodiment of the present invention, the lock member receiving member 52 possesses plural lock member receiving portions 53 defined in a circumferential direction of the lock member receiving member 52 at a predetermined interval therebetween. A lock portion 51*a* at a tip end of the lock member 51 can be selectively engaged to the one of the plural lock member receiving portions 53 according to a rotational angle phase of the vehicle wheel steering shaft 8. The steering wheel shaft 3 is coupled to the motor case 33 via the coupling 22 and the pin 31 such that the steering wheel shaft 3 can not be rotated relative to the motor case 33. When the lock member 51 is not engaged to the lock member receiving member 52, the motor output shaft 36 rotates relative to the motor case 33. The rotation thereof is transmitted to the first internal gear 39 and the second internal gear 139 via the external gear 38. The first internal gear 39 fixed to the motor case 33 is not rotated relative to the external gear 38 such that the first internal gear 39 rotates at the substantially same rotational speed as the steering wheel shaft 3. That is, the first internal gear 39 rotates following the manual operation of the steering wheel 2. The rotational speed of the motor output shaft 36 is decelerated by the second internal gear 139 and is transmitted to the vehicle wheel steering shaft 8. Therefore, the second internal gear 139 acts for driving the vehicle wheel steering shaft 8 for its rotation. On the other hand, when the lock member 51 is engaged to the lock member receiving member 52, the motor output shaft 36 can not rotate relative to the motor case 33. The first internal gear 39 is fixed to the motor case 33, but the second internal gear 139 is not. Therefore, the rotation of the steering wheel shaft 3 is directly transmitted to the vehicle wheel steering shaft 8 via the first internal gear 39, the external gear 38, and the second internal gear 139 in this order.

According to the embodiment of the present invention, the lock member receiving member 52 is assembled at the outer peripheral surface at one end of the motor output shaft 36. Each lock member receiving portion 53 is recessed in a radially inner direction of the lock member receiving member 52 from an outer peripheral surface thereof. As illustrated in FIG. 2, the lock member 51 is rotatably assembled on a rotation base 300 which is disposed on the motor case 33 in a direction parallel to an axial direction of the vehicle wheel steering shaft 8. A rear end portion 51b of the lock member 51 is engaged with the rotation base 300. Disposed is also an elastic member 54 for elastically returning the lock member 51 at an initial position when a solenoid 55 is not electrically excited. Therefore, when the solenoid 55 is electrically excited or not, the lock portion 51a of the lock member 51 is moved to be away from or to be closer to the lock member receiving member 52 via a convex portion 55a of the solenoid 55 and a groove defined at the rear end portion 51b of the lock member 51. When the solenoid 55 is electrically excited, the lock mechanism 19 can establish either the locked condition or the unlocked condition. According to the embodiment of the present invention, the lock mechanism 19 is designed to establish the unlocked condition when the solenoid 55 is electrically excited. Therefore, when the electrical excitation to the solenoid 55 is terminated at a time of cutting off from the power supply source, the lock mechanism 19 establishes the locked condition by the elastic member 54 such that the manual steering operation can be performed.

Figure 4:
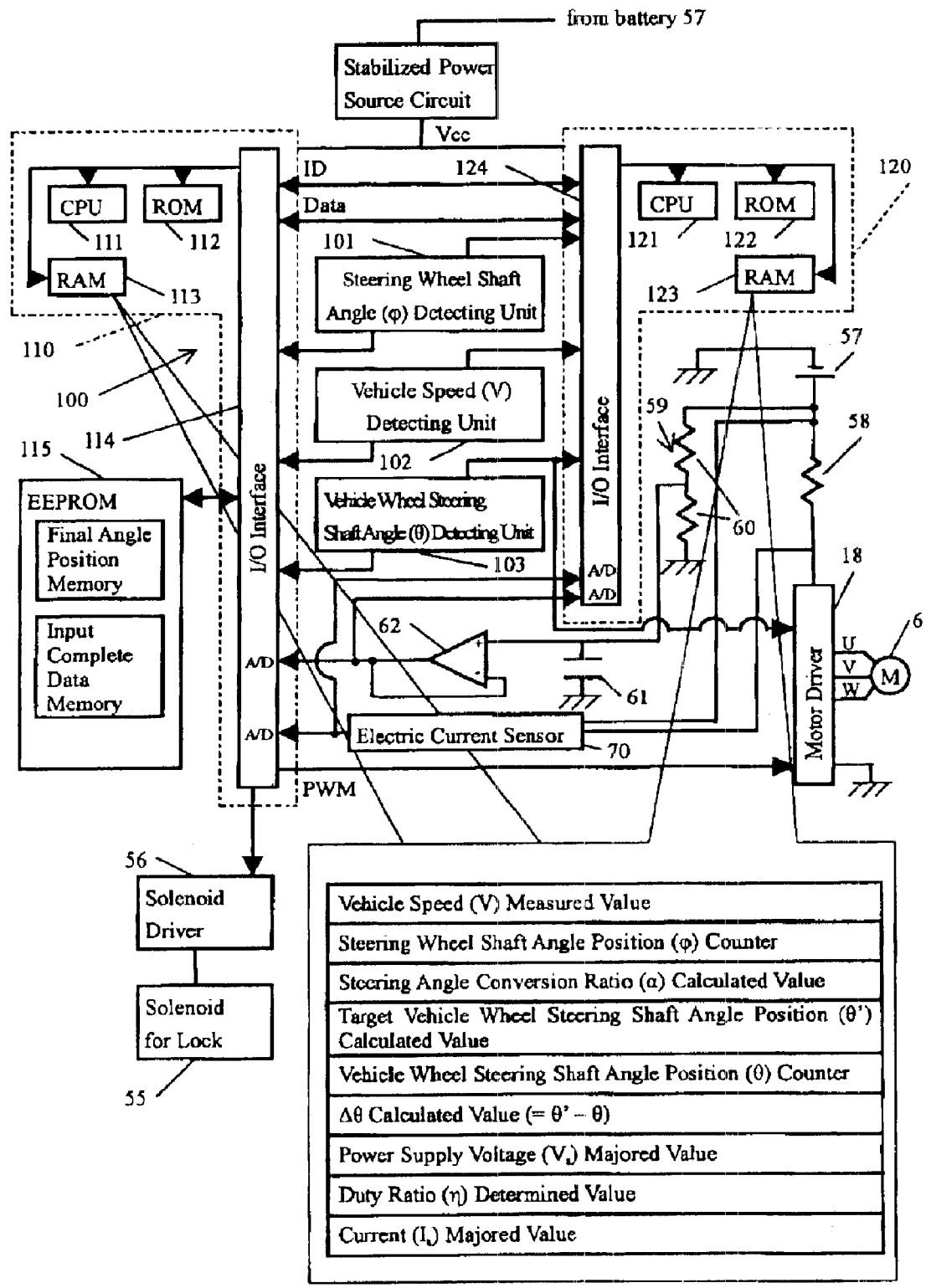
FIG. 4 is a block diagram illustrating an electrical structure of the vehicle steering control system according to the embodiment of the present invention.

As seen in FIG. 4, the steering control unit 100 according to the embodiment of the present invention houses a main microcomputer 110 and a sub microcomputer 120. The main microcomputer 110 houses a main CPU 111, a ROM 112 storing a control program, a RAM 113 as a work area of the main CPU 111, and an input-output interface 114 (hereinafter, referred to as an I/O interface 114). The sub microcomputer 120 houses a sub CPU 121, a ROM 122 storing a control program, and a RAM 123 as a work area for the sub CPU 121, and an input-output interface 124 (hereinafter, referred to as an I/O interface 124). The main microcomputer 110 directly controls the operation of the motor 6 (i.e. the actuator) for rotating the vehicle wheel steering shaft 8. The sub microcomputer 120 also performs data processing required for controlling the operation of the motor 6 such as parameter calculation, as well as the main microcomputer 110. Further, the sub microcomputer 120 monitors and confirms whether or not the main microcomputer 110 has normally operated, based upon a result of data communication therebetween. Therefore, the sub microcomputer 120 can also act as an auxiliary control unit for supplement data as required. The data communication between the main microcomputer 110 and the sub microcomputer 120 is performed via the I/O interfaces 114 and 124.

While the vehicle has been operated, i.e. while the vehicle wheel has been steered, a power supply voltage Vcc (e.g. +5 V) is supplied to each microcomputer 110 and 120. The power supply voltage Vcc is generated through conversion of a battery voltage (e.g. +7 through 12 V) from a battery 57 by a stabilized power source circuit 212. On the other hand, when the vehicle operation is terminated, i.e. when an ignition switch (not shown) is turned off, the supply of the power supply voltage Vcc to both microcomputers 110 and 120 is cut off. A voltage being substantially equal to or greater than an operating voltage is then supplied to the microcomputers 110 and 120 by a backup power source 211 for a predetermined period of time. Subsequently, any voltage supply to both the microcomputers 110 and 120 are terminated.

Each detection value by the steering wheel shaft angle detecting unit 101, the vehicle speed detecting unit 102, and the vehicle wheel steering shaft angle detecting unit 103 is inputted to the I/O interface 114 of the main microcomputer 110 and the I/O interface 124 of the sub microcomputer 120. According to the embodiment of the present invention, each detecting unit is configured with a rotary encoder. A counting signal from each rotary encoder is directly inputted to a digital port of each I/O interface 114 and 124 via a schmitt trigger (not shown). The I/O interface 114 of the main microcomputer 110 is connected with the solenoid 55 acting as a driving unit of the lock mechanism 19 via a solenoid driver 56.

According to the embodiment of the present invention, the motor 6 is configured with a three-phase brushless motor and the rotational speed thereof can be adjusted by a pulse-width modulation control (hereinafter, referred to as a PWM control). Referring to FIG. 4, the motor driver 18 is connected with the in-vehicle battery 57 as a power source of the motor 6. A power supply voltage Vs (i.e. a battery voltage Vs) of the battery 57 transmitted to the motor driver 18 varies (e.g. +7V to +14V) in accordance with load dispersed at each portion of the vehicle, a condition of an alternator which generates electric power, or the like. According to the embodiment of the present invention, the battery voltage Vs that varies in a certain range is utilized as a motor power supply voltage without using a stabilized power source circuit 212. The steering control unit 100 controls the operation of the motor 6 on the assumption that the power supply voltage Vs, which varies at the certain range as aforementioned, is utilized. Therefore, the steering control unit 100 further houses a measuring unit for measuring the power supply voltage Vs. According to the embodiment of the present invention, a pair of voltage dividers 60 as the detecting unit is provided in a passage branching from a portion immediately in front of the motor driver 18 on a current supply passage to the motor 6. Therefore, a voltage detection signal representing the power supply voltage Vs can be obtained via the pair of voltage dividers 60. The voltage detection signal is smoothed by a capacitor 61 and is inputted to each inlet port with an A/D converting means (hereinafter, referred to as an A/D port) of each I/O interface 114 and 124 via a voltage follower 62.

Provided further is an electric current detecting unit in the current supply passage to the motor 6 so as to monitor the condition of the electric current supply to the motor 6, for example whether over current occurs or not. More particularly, a shunt resistance (i.e. an electric current detecting resistance) 58 is mounted in the current supply passage to the motor 6. A voltage difference between both ends of the shunt resistance 58 is detected by an electric current sensor 70 (i.e. a current detecting means) and a detected value of a current $I_s$ based upon the voltage difference therebetween is inputted to the A/D port of each I/O interface 114 and 124. Meanwhile, a Hall element or a current detecting coil can be utilized so as to detect the electric current based upon electromagnetic principles in substitution for the shunt resistance 58.

As explained in FIG. 4, the RAM 113 for the main microcomputer 110 and the RAM 123 for the sub microcomputer 120 possess following memory areas, respectively:

(1) a vehicle speed V majored value memory for memorizing a majored value representing the current vehicle speed V majored by the vehicle speed sensor 102;

(2) a steering wheel shaft angle position ϕ counter memory for counting a counting signal outputted from the rotary encoder for the steering wheel shaft angle position detecting unit 101 and for memorizing the count representing a steering wheel shaft angle position ϕ. In this case, the rotary encoder capable of recognizing a rotational direction of the steering wheel shaft 3, incrementing the counter at a time of a forward rotation thereof, and decrementing the counter at a time of a reverse rotation thereof;

(3) a steering angle conversion ratio α calculated value memory for memorizing the steering angle conversion ratio a calculated based upon the vehicle speed V majored value;

(4) a target vehicle wheel steering shaft angle position θ' calculated value memory for memorizing a target vehicle wheel steering shaft angle position θ' calculated based upon the current steering wheel shaft angle position ϕ and the steering angle converting ratio α, and the target vehicle wheel steering shaft angle position θ' expressed for example in accordance with the following formula: ϕ*α;

(5) the vehicle wheel steering shaft angle position θ counter memory for counting a counting signal from the rotary encoder for the vehicle wheel steering shaft angle detecting unit 103 and for memorizing the count representing a current vehicle wheel steering shaft angle position θ, the vehicle wheel steering shaft angle detecting unit 103 configured with an incremental-type rotary encoder capable of recognizing a rotational direction of the vehicle wheel steering shaft 8, and the incremental-type rotary encoder incrementing the counter when the vehicle wheel steering shaft 8 rotates in the forward direction and decrementing the counter when it rotates in the reverse direction;

(6) a Δθ calculated value memory for memorizing a calculated value representing an angle deviation of the current vehicle wheel steering shaft angle position θ from the target vehicle wheel steering shaft angle position θ', and the angle deviation Δθ expressed in accordance with the following equation: Δθ=(θ'−θ);

(7) a power supply voltage Vs majored value memory for memorizing a majored value representing the power supply voltage Vs for the motor 6;

(8) a duty ratio η determined value memory for memorizing a duty ratio η determined based upon the angle deviation Δθ and the power supply voltage Vs so as to apply the PWM control to the motor 6; and (9) a current $I_s$ measured value memory for memorizing a majored value representing an electric current $I_s$ majored by the electric current sensor 70;

An EEPROM 115 (i.e. a Programmable Read-Only Memory, PROM) is connected to the I/O interface 114 for the main microcomputer 110. The EEPROM 115 houses a final angle position memory (i.e. a final angle position memorizing means) and an input complete data memory (i.e. an input complete data memorizing means). The final angle position memory stores a final angle position, i.e. the angle position of the vehicle wheel steering shaft 8 at a time of termination of the vehicle driving operation, i.e. at a time of off-operation of the ignitions switch. The input complete data memory selectively stores a data indicating that the input to the final angle position memory was completed or a data indicating that the input to the final angle position memory failed. Hereinafter, the data stored in the input complete data memory is referred to as an input complete flag. The input complete flag is configured with, for example a bit flag. When the data (i.e. the final angle position) was properly written into the final angle position memory, a first memory condition is established, wherein the input complete flag is set at "1" to send an enabled instruction. On the other hand, when the data (i.e. the final angle position) failed to be properly written into the final angle position memory, a second memory condition is established, wherein the input complete flag is set at "0" to send a disabled instruction.

When the CPU 111 for the main microcomputer 110 has been supplied with a first operating voltage (+5V) at which the CPU 111 reads out and writes the data relative to the RAM 113, the CPU 111 can only read out the date stored in the EEPROM 115. When the CPU 111 has been supplied with a, second operating voltage, the CPU 111 can write the data into the EEPROM 115. According to the embodiment of the present invention, the second operating voltage is designed to be higher than the first operating voltage, such as +7V. Therefore, data is not transcribed in error even when the CPU 111 runs away. The second operating voltage can be generated by a booster circuit which is not shown and is defined between the EEPROM 115 and the I/O interface 114.

Further, the CPU 111 configures an input complete data memory controlling means and an initial angle position set controlling means.

Figure 13:
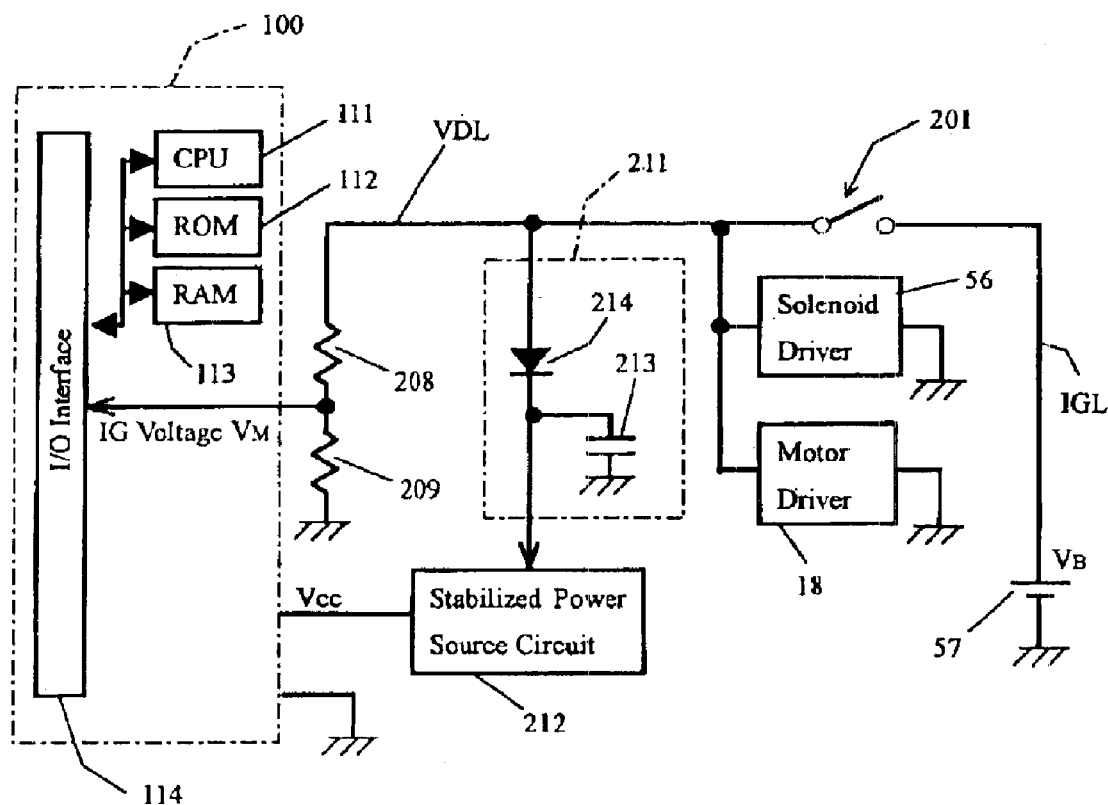
FIG. 13 is a block diagram illustrating an example of a power supply circuit of the steering control unit according to the embodiment of the present invention.

As illustrated in FIG. 13, a power supply passage IGL connects the battery 57 acting as the power supply source for the vehicle and the stabilized power source circuit 212. The steering control unit 100 is supplied with the operating voltage from the stabilized power source circuit 212 via a Vcc terminal. The stabilized power source circuit 212 possesses a known configuration having a Zener diode and a three-terminal regulator, or a DC—DC converter. The stabilized power source circuit 212 is connected to or disconnected from the battery 57 by a power switch 201 disposed in the power supply passage IGL. The power switch 201 directly cuts off the power supply passage IGL in response to the off operation of the ignition switch for stopping a vehicle driving operation. According to the embodiment of the present invention, the power switch 201 is utilized as the ignition switch. Alternatively, the power switch 201 can be provided so as to operate in response to the operation of the ignition switch.

When the power supply passage IGL is cut off in response to the off-operation of the power switch 201, the cutoff condition of the power supply passage IGL is detected by a power supply passage cutoff detecting means. The power supply passage cutoff detecting means detects the cutoff condition of the power supply passage IGL based upon a battery voltage (VB) applied to the stabilized power source circuit 212. When the power switch 201 is switched off, the power supply passage IGL is open and the battery voltage VB is hence widely decreased. Therefore, the cutoff condition of the power supply passage IGL can be easily and reliably detected based upon the decrease of the battery voltage VB. More particularly, a battery voltage detecting passage VDL branches from the power supply passage IGL at a rearward side of the power switch 201 from the viewpoint of the battery 57. The battery voltage VB is adjusted by resistances 208 and 209 and is inputted to the I/O interface 114 (i.e. an AiD conversion port) as an ignition monitor voltage VM (hereinafter, referred to as an IG voltage VM). A reverse current from the backup power source 211 to the battery voltage detecting passage VDL is not allowed by a diode 214. When the IG monitor voltage VM becomes substantially equal to or less than a predetermined reference value (e.g. 3V), the CPU 111 of the steering control unit 100 judges that the power supply passage IGL has been cut off. That is, the CPU 111 acts as a main body of the power supply passage cutoff detecting means.

The backup power source 211 acts so as to keep supplying the operating voltage for the steering control unit 100 when the voltage supply is interrupted from the battery 57 to the steering control unit 100 in response to the off operation of the power switch 201 for stopping the vehicle driving operation. The backup power source 211 is disposed in the power supply passage IGL between the battery 57 and the stabilized power source circuit 212. More particularly, the backup power source 211 is disposed at the rearward side of the power switch 201 from the viewpoint of the battery 57. The backup power source 211 includes a capacitor 213 as a storage means arranged in parallel to the power supply passage IGL. Further, as described above, disposed is the diode 214 between the branch point of the battery voltage detecting passage VDL and a branch point of the capacitor 213 such that the capacitor 213 is prevented from discharging electric current towards the battery voltage detecting passage VDL. The capacitor 213 is normally supplied with the electric current from the battery 57 via the diode 214 so as to maintain the capacitor 213 electrically charged. When the power supply from the battery 57 is interrupted in response to the off operation of the power switch 201, the period for supplying the operating voltage to the steering control unit 100 is extended and maintained for a predetermined time span by the capacitor 213. The predetermined time span is determined by setting an electric capacitance of the capacitor 213 at an appropriate value and should be assured with sufficient time span for transcribing the memory content in the final angle position memory and the input complete data memory. Further, the backup power source 211 can be disposed in the power supply passage IGL between the stabilized power source circuit 212 and the steering control unit 100.

Next, the following description will be given for explaining the operation of the vehicle steering control system 1 illustrated in FIG. 1.

Figure 8:
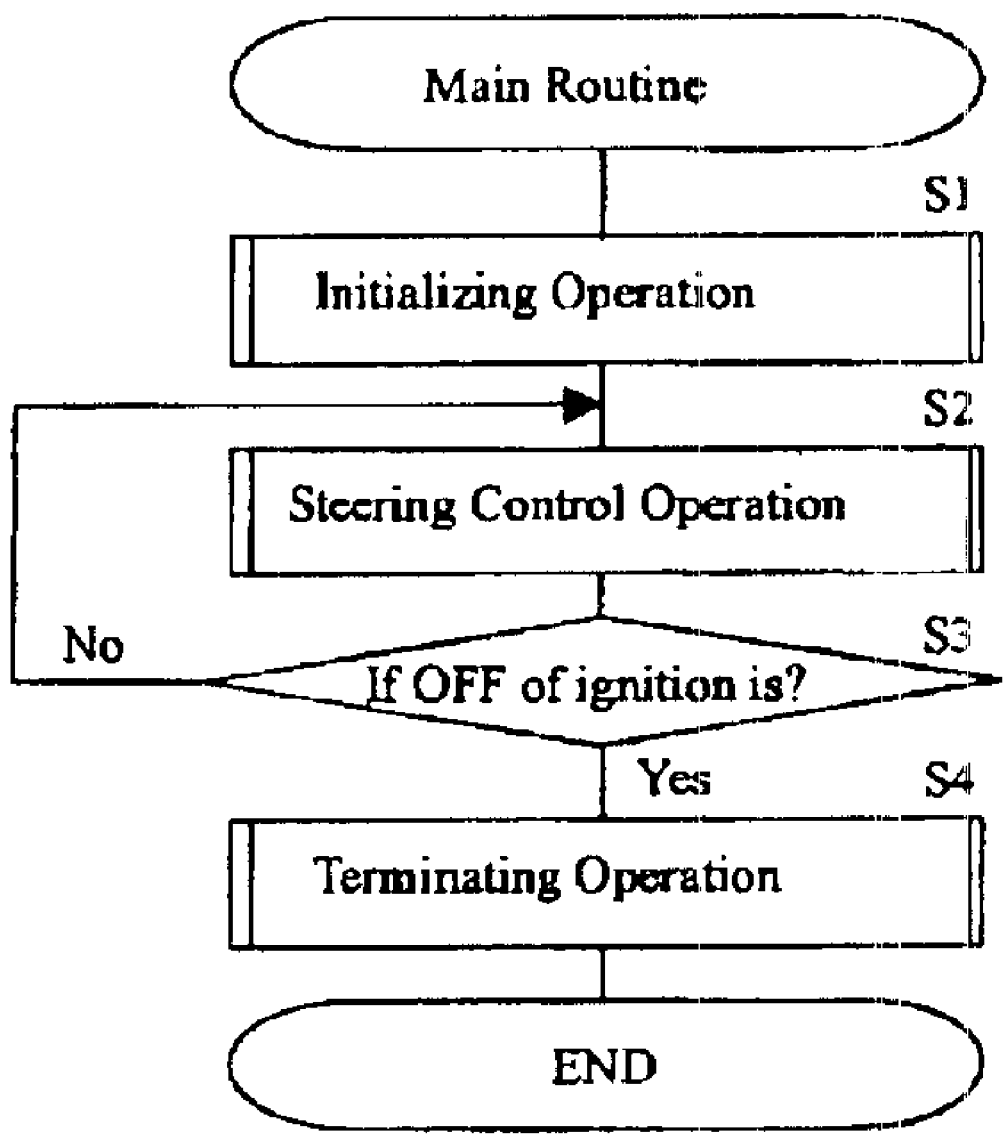
FIG. 8 is a flowchart for explaining a main routine of a computer process by the vehicle steering control system according to the embodiment of the present invention.
Figure 10:
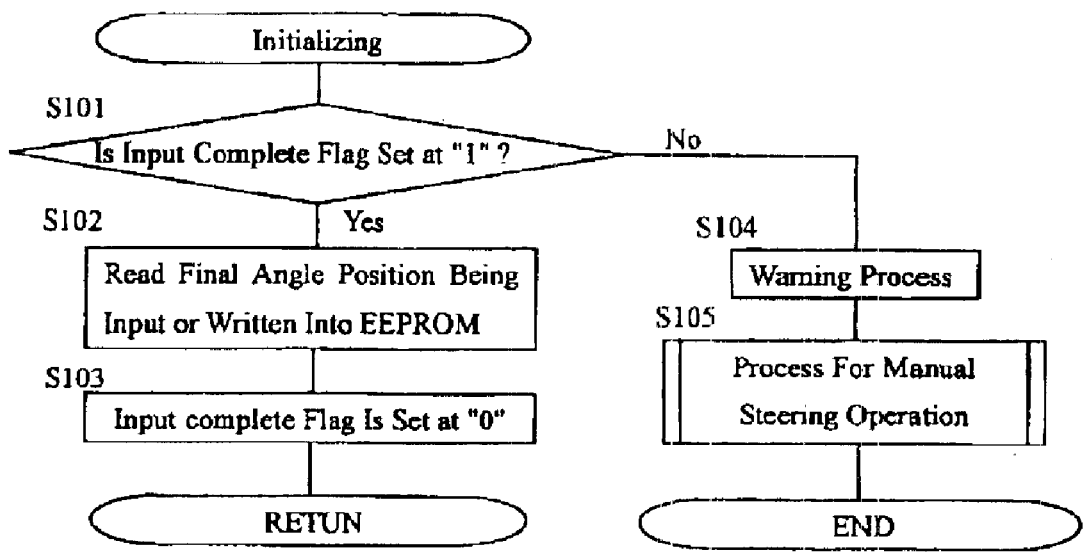
FIG. 10 is a flowchart for explaining an initial process illustrated in FIG. 8 according to the embodiment of the present invention.

As illustrated in FIG. 8, the microcomputer 110 first starts a main routine of the control program at step S1 for initializing. More particularly, as illustrated in FIG. 10, the microcomputer 110 reads out the input complete flag input or written into the EEPROM 115 at a previous terminating process in response to off-operation of the ignition switch. When the input complete flag is set at "1", an affirmative judgment is obtained at step S101 and the microcomputer 110 proceeds to step S102. At step S102, the microcomputer 110 reads out the final angle position of the vehicle wheel steering shaft 8 being input or written into the EEPROM 115. The final angle position is referred to as the initial angle position of the vehicle wheel steering shaft 8 for commencing the control program. More particularly, the count representing the final angle position is set in the aforementioned vehicle wheel steering shaft angle position counter memory (i.e. a vehicle wheel steering shaft angle position memorizing means). At step 103, the input complete flag is set at "0", i.e. is set at the second memory condition.

On the other hand, when the input complete flag has not been set at "1" at step S101, the microcomputer 110 judges that the final angle position being written in the EEPROM 115 is disabled to be referred to such that the CPU 111 carries out a process for an abnormal condition. According to the embodiment of the present invention, the microcomputer 110 proceeds to step S104 for performing a warning process which is one of the processes for abnormal conditions. For example, an alarm lamp lights on, which is disposed in a cockpit panel of the vehicle. Further, any sound can be utilized for warning the driver. Basically, when the malfunction is detected, the vehicle is carried to a repair plant and a microcomputer of the vehicle, for example is repaired. In this case, the vehicle may not be normally operated until it is repaired such that it will be critically troublesome to carry the disabled car to the repair plant. In order to overcome the problem, the vehicle can be continuously driven if a manual steering mechanism operates in case of the malfunction. Therefore, according to the embodiment of the present invention, the microcomputer 110 performs at S105 a process for commencing a routine for performing manual steering operation. According to the manual steering operation, the lock mechanism 19 illustrated in FIG. 1 is operated so as to lock the steering shaft 3 and the vehicle wheel steering shaft 8 for their integral rotation.

The microcomputer 110 then proceeds to step S2 after initializing operation for performing a steering control process. The steering control process at step S2 is repeatedly performed at a predetermined period of time basis (e.g. several hundred $\mu$s) so as to uniformize an interval for sampling parameters. Details of the steering control process are described below with reference to a flowchart illustrated in FIG. 9. At step S201, the microcomputer 110 reads out the majored value representing the current vehicle speed V. At step S202, the microcomputer 110 reads out the steering wheel shaft angle position $\phi$. At step S203, the microcomputer 110 determines the steering angle conversion ratio $\alpha$ for converting the steering wheel shaft angle position $\phi$ to the target vehicle wheel steering shaft angle position $\theta'$, with reference to the majored value representing the vehicle speed V. That is, the steering angle conversion ratio $\alpha$ varies in accordance with the vehicle speed V. More particularly, as illustrated in FIG. 6, when the vehicle speed V is detected to be greater than a predetermined speed value, the steering angle conversion ratio $\alpha$ is set to be relatively small. On the other hand, when the vehicle speed V is detected to be smaller than the predetermined speed value, the steering angle conversion ratio $\alpha$ is set to be relatively large. According to the embodiment of the present invention, the steering control unit 100 houses a table 130 as illustrated in FIG. 5 in the ROM 112 (the ROM 122) for defining a setting value of the steering angle conversion ratio $\alpha$ corresponding to each vehicle speed V. The steering angle conversion ratio $\alpha$ corresponding to the current vehicle speed V hence can be computed by interpolation method with reference to the table 130.

As described above, according to the embodiment of the present invention, the vehicle speed V is referred to as information representing the vehicle driving condition. Alternatively, vehicle lateral load or an angle of gradient of road can be referred to as the information representing the vehicle driving condition. The steering angle conversion ratio a can be set at $\alpha$ value corresponding to a value of the vehicle lateral load or the angle of the gradient of the road detected by a sensor. Still alternatively, a basic value of the steering angle conversion ratio $\alpha$ can be determined corresponding to the vehicle speed V. The basic value thereof is corrected as needed based upon information apart from the vehicle speed.

Figure 9:
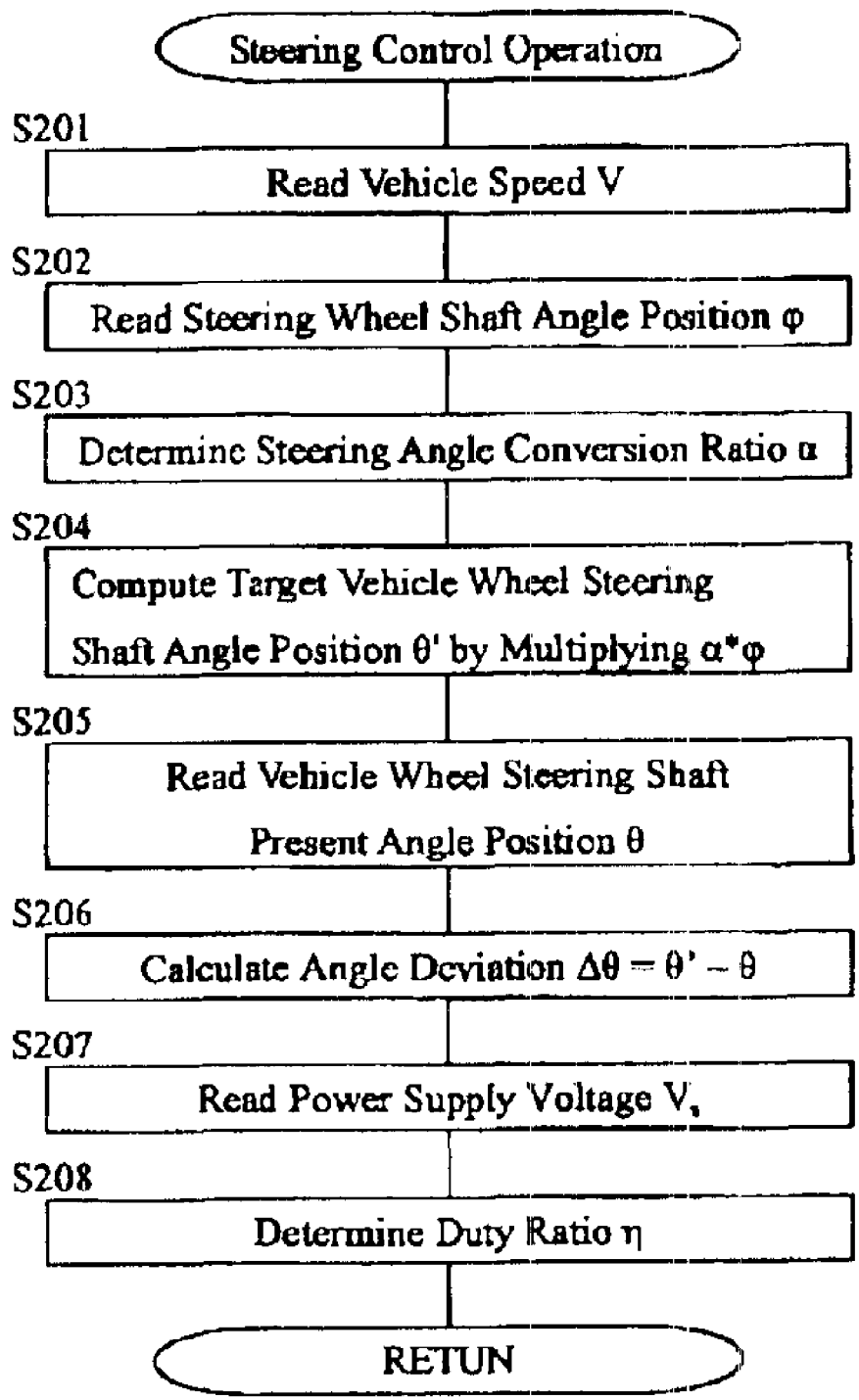
FIG. 9 is a flowchart for explaining details of a steering control process illustrated in FIG. 8.

Going back to the steering control process with reference to the flowchart illustrated in FIG. 9, at step S204, the microcomputer 110 computes the target vehicle wheel steering shaft angle position $\theta'$ by multiplying the steering wheel shaft angle position $\phi$ with the determined steering angle conversion ratio $\alpha$. At step 205, the microcomputer 110 reads out the current vehicle wheel steering shaft angle position $\theta$. At step 206, the microcomputer 110 computes the angle deviation $\Delta\theta$ of the current vehicle wheel steering shaft angle position $\theta$ from the target vehicle wheel steering shaft angle position $\theta'$. At step 207, the microcomputer 110 reads out the current power supply voltage Vs.

The motor 6 drives the vehicle wheel steering shaft 8 for its rotation so as to reduce or cancel the angle deviation $\Delta\theta$. When the $\Delta\theta$ is relatively large, the rotational speed of the motor 6 is increased. On the other hand, when the $\Delta\theta$ is relatively small, the rotational speed of the motor 6 is decreased. Therefore, the current vehicle wheel steering shaft angle position $\theta$ can be rapidly and smoothly approximated to the target vehicle wheel steering shaft angle position $\theta'$. As a fundamental idea of the present invention, the motor 6 is applied with a proportional control based upon the angle deviation $\Delta\theta$ as a parameter. However, it is more preferable that the motor 6 be applied with a known proportional-integral-differential control (hereinafter, referred to as a PID control) in consideration of integrating or differentiating the angle deviation $\Delta\theta$, thereby overshooting, hunting, and the like are suppressed to promote control stabilization.

As described above, the motor 6 has been applied with the PWM control and the rotational speed thereof can be adjusted by changing the duty ratio $\eta$. If the power supply voltage Vs is always fixed, the rotational speed of the motor 6 can be adjusted in accordance with the duty ratio $\eta$. However, according to the embodiment of the present invention, the power supply voltage Vs is not always fixed. Therefore, the duty ratio $\eta$ is required to be determined in consideration of the power supply voltage Vs as well. For example, as illustrated in FIG. 7, the ROM 112 (the ROM 122) respectively stores a two-dimensional duty ratio converting table 131 for obtaining the duty ratio $\eta$ corresponding to each combination of the power supply voltage Vs and the angle deviation $\Delta\theta$. That is, A value of the duty ratio $\eta$ corresponding to a detected value of the power supply voltage Vs and a calculated value of the deviation $\Delta\theta$ can be read and used. Further, the rotational speed of the motor 6 varies due to load as well. In this case, the motor load can be estimated based upon the majored value representing the current $I_s$ by the electric current sensor 70. The duty ratio $\eta$ can be hence corrected based upon the estimated motor load.

The above-described process is performed not only by the main microcomputer 110 but also by the sub microcomputer 120. More particularly, the sub microcomputer 120 monitors whether or not the main microcomputer 110 has malfunctioned. That is, the calculation result for each parameter stored in the RAM 113 of the main microcomputer 110 is transferred to the sub microcomputer 120 as needed. In the sub microcomputer 120, the transferred calculation result is then cross-checked with the memory content stored in the RAM 123 thereof. In the meantime, the main microcomputer 110 generates the PWM signal based upon the determined duty ratio $\eta$. The motor 6 is applied with the PWM control by the motor driver 18 with reference to the signal from the rotary encoder of the vehicle wheel steering shaft angle detecting unit 103.

Going back to the main routine with reference to the flowchart illustrated in FIG. 8, at step S3, the microcomputer 110 judges whether or not the ignition switch has been turned off. The microcomputer 110 judges that the ignition switch has been turned off when the IG monitor voltage VM is substantially equal to or less than the predetermined reference value (e.g. 3V). When the ignition switch has been turned off, an affirmative judgment (YES) is obtained at step S3. Therefore, the microcomputer 110 proceeds to step S4 for performing a process for terminating the main routine. When the ignition switch is turned off, the power switch 201 illustrated in FIG. 13 is turned off. The power supply from the battery 57 to the steering control unit 100 is hence interrupted. Therefore, the process for terminating the main routine is designed to be performed during the predetermined time span in which the operating voltage is supplied to the CPU 111 from the backup power source 211.

Figure 11:
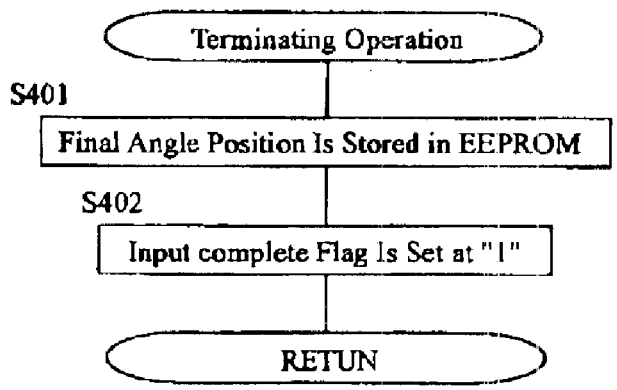
FIG. 11 is a flowchart for explaining a process for terminating the main routine illustrated in FIG. 8 according to the embodiment of the present invention.

FIG. 11 shows details of the process for terminating the main routine. The turn-off of the ignition switch means that the vehicle driving operation was terminated. At this point, the main microcomputer 110 reads out the final vehicle wheel steering shaft angle position stored in the RAM 113. The final vehicle wheel steering shaft angle position is then stored in the final angle position memory of the EEPROM 115. Further, the input complete flag is set at "1", i.e. set at the first memory condition such that the main routine is terminated.

If the CPU 111 malfunctions at the time of performing the process for terminating the main routine, the final angle position may not be input or written into the EEPROM 115, or an error value not identical to the actual final angle position may be inputted or written thereto in error.

As another embodiment of the present invention concerning to the process for terminating the main routine, the final vehicle wheel steering shaft angle position being stored in the RAM 123 of the sub microcomputer 120 can be referred to as the final angle position. The data from the RAM 123 can be then written or inputted into the EEPROM 115 in substitution for the data from the RAM 113 of the main microcomputer 110. In this case, the operation of the sub microcomputer 120 should be also assured during the aforementioned predetermined time span for supplying the operating voltage. As illustrated in FIG. 4, the stabilized power source circuit 212 is communized by the microcomputers 110 and 120. Therefore, the data in the microcomputers 110 and 120 can be backed up together by disposing the backup power source 211 between the battery 57 and the stabilized power source circuit 212, as illustrated in FIG. 13.

Figure 12:
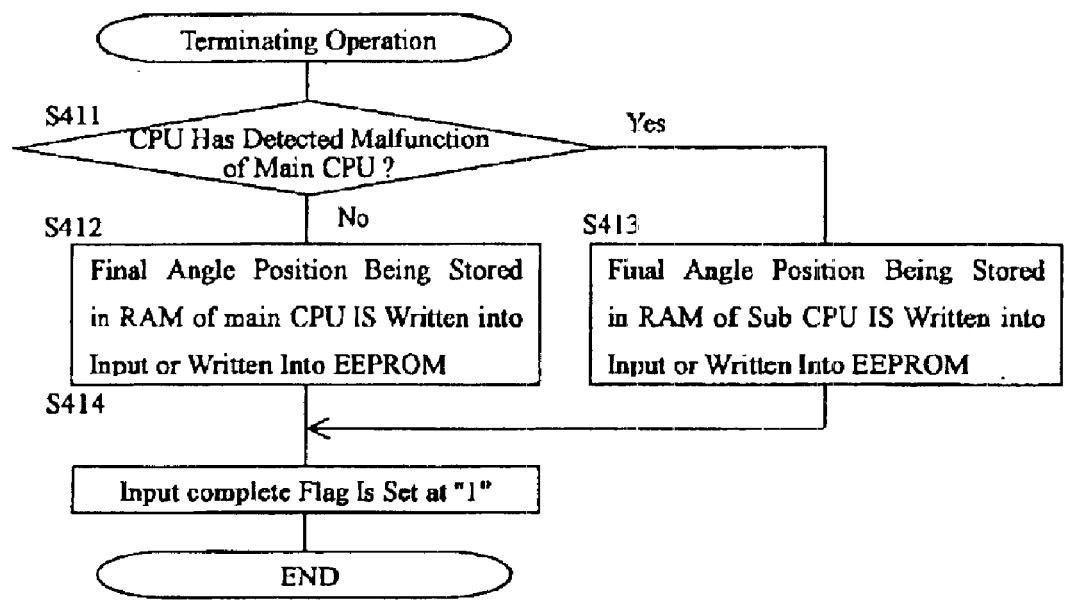
FIG. 12 is a flowchart for explaining the process for terminating the main routine illustrated in FIG. 8 according to another embodiment of the present invention.

More particularly, as illustrated in FIG. 12, at step S411, the sub microcomputer 120 judges whether or not the CPU 121 has detected the malfunction of the main CPU 111. If the CPU 121 is judged to have detected it, an affirmative judgment (YES) is obtained at step S411. Therefore, the sub microcomputer 120 proceeds to step S413 for inputting or writing the final angle position $\theta$ being stored in the RAM 123 of the sub CPU 121 into the EEPROM 115 as a final angle position. The microcomputer 120 proceeds to step S414 for setting the input complete flag at the first memory condition. On the other hand, when the CPU 121 has not detected the malfunction of the main CPU 111 at step S411, a negative judgment (NO) is obtained at step S411. Therefore, the microcomputer 110 proceeds to step S412 as a normal routine so as to input or write the final angle position θ being stored in the RAM 113 of the main microcomputer 110 into the EEPROM 115 as the final angle position. The microcomputer 110 then proceeds to step S414 so as to set the input complete flag at the first memory condition.

As described above, according to the embodiment of the present invention, the microcomputer can judge whether or not the final angle position was properly written in the final angle position memorizing means at the previous time of termination of the vehicle driving condition, based upon the memory content in the input complete data memorizing means. Further, even when the correct final angle position has not been memorized in the final angle position memorizing means due to the failure in writing, the steering control system can be prevented from employing the error value as the initial angle position.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A steering control system for a vehicle including a steering wheel shaft transmitted with an operation angle of a steering wheel, a vehicle wheel steering shaft mechanically disconnected from the steering wheel shaft, and an actuator for rotating the vehicle wheel steering shaft at a vehicle wheel steering angle depending on the operation angle of the steering wheel and a vehicle driving condition, the steering control system comprising:

a steering wheel shaft angle detecting means for detecting a steering wheel shaft angle position;

a vehicle wheel steering shaft angle detecting means for detecting a vehicle wheel steering shaft angle position;

a vehicle condition detecting means for detecting the vehicle driving condition; and a drive controlling means for determining a target angle position of the vehicle wheel steering shaft based upon the steering wheel shaft angle position and the vehicle driving condition and for controlling the operation of the actuator so as to approximate the vehicle wheel steering shaft angle position to the target angle position, the drive controlling means comprising:

a final angle position memorizing means for memorizing a final angle position representing the vehicle wheel steering shaft angle position at a time of termination of the vehicle driving operation, the final angle position memorizing means capable of maintaining the memory content even when the vehicle is stationary;

an input, complete data memorizing means capable of switching the memory content between a first memory condition and a second memory condition, the first memory condition indicating completeness of writing of the final angle position in the final angle position memorizing means, and the second memory condition indicating failure in writing the final angle position therein, the input complete data memorizing means capable of maintaining the memory content even when the vehicle is stationary;

an input complete data memory controlling means for setting the memory content memorized in the input complete data memorizing means at the first memory condition in response to the completeness of writing of the final angle position in the final angle position memorizing means; and an initial angle position set controlling means for allowing to employ the final angle position memorized in the final angle position memorizing means as an initial angle position of the vehicle wheel steering shaft when the memory content in the input complete data memorizing means is at the first memory condition at a time of restart of the vehicle driving operation after temporal termination of the vehicle driving operation and for prohibiting to employ the final angle position as the initial angle position when the memory content in the input complete data memorizing means is at the second memory condition at the time of restart of the vehicle driving operation after the temporal termination of the vehicle driving operation.

2. A steering control system for a vehicle according to claim 1, wherein the input complete data memory controlling means sets the input complete data memorizing means at the second memory condition at a time of commencement of the vehicle driving operation and updates the memory content in the input complete data memorizing means so as to set the input complete data memorizing means at the first memory condition when the final angle position is written into the final angle position memorizing means at the time of the termination of the vehicle driving operation, and the input complete data memory controlling means does not update the memory content in the input complete data memorizing means when the final angle position falls to be written in the final angle position memorizing means.

3. A steering control system for a vehicle according to claim 1, further comprising:

a CPU and a RAM as a work area of the CPU included in the drive controlling means; and a vehicle wheel steering shaft angle position memorizing means for memorizing a detected value of the vehicle wheel steering shaft angle position during the vehicle driving operation as needed, the vehicle wheel steering shaft angle position memorizing means included in the RAM, wherein the CPU and the RAM are designed such that supply of electric power from a vehicle battery to the CPU and the RAM is interrupted in response to the termination of the vehicle driving operation.

4. A steering control system for a vehicle according to claim 2, further comprising:

a CPU and a RAM as a work area of the CPU included in the drive controlling means; and a vehicle wheel steering shaft angle position memorizing means for memorizing a detected value of the vehicle wheel steering shaft angle position during the vehicle driving operation as needed, the vehicle wheel steering shaft angle position memorizing means included in the RAM, wherein the CPU and the RAM are designed such that supply of electric power from a vehicle battery to the CPU and the RAM is interrupted in response to the termination of the vehicle driving operation.

5. A steering control system for a vehicle according to claim 3, wherein each of the final angle position memorizing means and the input complete data memorizing means is configured with a PROM, the CPU can only read out the data in the PROM at a first operating voltage at which the CPU reads out and writes the data relative to the RAM, and the CPU can write the data in the PROM at a second operating voltage which is different from the first operating voltage.

6. A steering control system for a vehicle according to claim 4, wherein each of the final angle position memorizing means and the input complete data memorizing means is configured with a PROM, the CPU can read out the data in the PROM at a first operating voltage at which the CPU reads out and writes the data relative to the RAM, and the CPU can write the data in the PROM at a second operating voltage which is different from the first operating voltage.

7. A steering control system for a vehicle according to claim 5 further comprising:
a power switch disposed in a power supply passage for supplying the electric current to the drive controlling means from the battery as an electric power source of the vehicle and capable of switching a connection between the battery and the drive controlling means to be established or interrupted in response to operation of a vehicle driving switch for performing or terminating the vehicle driving operation; and
a backup power source for extending a time span for supplying electric current to the drive controlling means and for maintaining the supply of the electric current to the drive controlling means for a predetermined time span so as to update the memory content in the final angle position memorizing means and the input complete data memorizing means even after the supply of the electric current from the battery to the drive controlling means is interrupted in accordance with the cut off of the power supply passage by the power switch in response to the off operation of the vehicle driving switch for terminating the vehicle driving operation.

8. A steering control system for a vehicle according to claim 6 further comprising:
a power switch disposed in a power supply passage for supplying the electric current to the drive controlling means from the battery as an electric power source of the vehicle and capable of switching a connection between the battery and the drive controlling means to be established or interrupted in response to operation of a vehicle driving switch for performing or terminating the vehicle driving operation; and
a backup power source for extending a time span for supplying electric current to the drive controlling means and for maintaining the supply of the electric current to the drive controlling means for a predetermined time span so as to update the memory content in the final angle position memorizing means and the input complete data memorizing means even after the supply of the electric current from the battery to the drive controlling means is interrupted in accordance with the cut off of the power supply passage by the power switch in response to the off operation of the vehicle driving switch for terminating the vehicle driving operation.

9. A steering control system for a vehicle according to claim 7, wherein the backup power source possesses a storage means capable of maintaining a voltage to be supplied to the control driving means to be substantially equal to or greater than an operating voltage of the control driving means for a predetermined time span in response to the cutoff of the power supply passage by the power switch.

10. A steering control system for a vehicle according so claim 8, wherein the backup power source possesses a storage means capable of maintaining a voltage to be supplied to the control driving means to be substantially equal to or greater then an operating voltage of the control driving means for a predetermined time span in response to the cutoff of the power supply passage by the power switch.

11. A steering control system for a vehicle according to claim 9, wherein the CPU is applied with a power voltage from the battery via a stabilized power supply circuit and the storage means is arranged to be parallel to the power supply passage between the battery and the stabilized power supply circuit.

12. A steering control system for a vehicle according to claim 10, wherein the CPU is applied with a power voltage from the battery via a stabilized power supply circuit and the storage mean is arranged to be parallel to the power supply passage between the battery and the stabilized power supply circuit.

13. A steering control system for a vehicle according to claim 7, wherein the drive controlling means further comprising:
a main CPU for controlling the operation of the actuator for the vehicle wheel steering shaft, the operation of the actuator for the vehicle wheel steering shaft performed mainly by the main CPU; and
a sub CPU for performing at least detection of the vehicle wheel steering shaft angle position among processes performed by the main CPU in parallel with the main CPU; and
a RAM for the sub CPU as a work memory of the sub CPU,
wherein the sub CPU is supplied with the electric current by the backup power source for the predetermined time span, and a value representing the final angle position of the vehicle wheel steering shaft being stored in the RAM for the sub CPU is memorized in the final angle position memorizing means as the final angle position when the sub CPU detects a malfunction of the main CPU while in the predetermined time span.

14. A steering control system for a vehicle according to claim 8, wherein the drive controlling means further comprising:
a main CPU for controlling the operation of the actuator for the vehicle wheel steering shaft, the operation of the actuator for the vehicle wheel steering shaft performed mainly by the main CPU; and
a sub CPU for performing at least detection of the vehicle wheel steering shaft angle position among processes performed by the main CPU in parallel with the main CPU; and
a RAM for the sub CPU as a work memory of the sub CPU,
wherein the sub CPU is supplied with she electric current by the backup power source for the predetermined time span, and a value representing the final angle position of the vehicle wheel steering shaft being stored in the RAM for the sub CPU is memorized in the final angle position memorizing means as the final angle position when the sub CPU detects a malfunction of the main CPU while in the predetermined time span.

* * * * *